US00RE40765E

(19) United States
(12) Reissued Patent
Kovacs

(10) Patent Number: US RE40,765 E
(45) Date of Reissued Patent: Jun. 23, 2009

(54) FLUID-OPERATED POWER TOOL

(75) Inventor: John R. Kovacs, Blairstown, NJ (US)

(73) Assignee: torcUp, Inc., Easton, PA (US)

(21) Appl. No.: 11/803,416

(22) Filed: May 14, 2007

Related U.S. Patent Documents

Reissue of:
(64) Patent No.: 6,223,836
Issued: May 1, 2001
Appl. No.: 08/910,977
Filed: Aug. 7, 1997

(51) Int. Cl.
*E21B 17/22* (2006.01)
*B25B 13/46;* (2006.01)
*B25B 17/00* (2006.01)

(52) U.S. Cl. ..... 173/218; 81/57.39

(58) Field of Classification Search ..... 173/213, 173/218, 220, 177; 81/57.39
See application file for complete search history.

(56) References Cited

U.S. PATENT DOCUMENTS 3,669,012 A * 6/1972 Nebel ..... 100/121
3,802,517 A * 4/1974 Cooke-Yarborough ..... 173/18
4,031,893 A * 6/1977 Kaplan et al. ..... 604/136
4,756,241 A * 7/1988 Sakurahara et al. ..... 92/233
4,896,584 A * 1/1990 Stoll et al. ..... 92/5 R
4,938,296 A * 7/1990 Brazell, II ..... 173/185
4,938,745 A * 7/1990 Sagstetter ..... 604/263
5,003,847 A * 4/1991 Wagner ..... 81/57.39
5,076,225 A * 12/1991 Tokoro et al. ..... 123/193.1
5,203,238 A * 4/1993 Ferguson ..... 81/57.39
5,327,864 A * 7/1994 Regueiro ..... 123/260
5,544,627 A * 8/1996 Terziev et al. ..... 123/53.1
5,630,353 A * 5/1997 Mittlefehldt et al. ..... 92/71

* cited by examiner

*Primary Examiner*—Rinaldi I. Rada
*Assistant Examiner*—John Paradiso
(74) *Attorney, Agent, or Firm*—Michael J. Striker

(57) ABSTRACT

A fluid-operated power tool has an engaging part including an engaging element for engaging and turning a threaded connector, and a drive part including a fluid-operated drive with a cylinder and a piston movable in the cylinder for turning the engaging element under the action of fluid admitted to the cylinder, the power drive part having a width which substantially does not exceed a width of the engaging part.

5 Claims, 2 Drawing Sheets

FLUID-OPERATED POWER TOOL

Matter enclosed in heavy brackets [ ] appears in the original patent but forms no part of this reissue specification; matter printed in italics indicates the additions made by reissue.

BACKGROUND OF THE INVENTION

The present invention relates to a fluid-operated power tools.

Fluid-operated power tools are known and used in many applications. A fluid-operated tool has an engaging part which engages a threaded connector to be turned, such as a nut, a bolt and the like, and a drive part in which a fluid-operated drive is arranged. The drive includes usually a cylinder, and a piston movable in the cylinder and connected with the engaging element of the engaging part. In many applications, the space for reaching a threaded connector is extremely narrow and therefore attempts have been made to make the tool as thin as possible. These attempts have been mainly concentrated on reducing the thickness of the engaging part, since the engaging part to be close to the height of the nut (a part of the threaded connector) has to enter a narrow space and to be fitted with its opening on a threaded connector or to be inserted with its projecting shaft into a threaded connector. However, no attempts have been made to reduce the tool as a whole. In many applications, however the whole tool has to be introduced into a very narrow space, including the drive part as well. With the conventional substantial thickness of the drive part, this is impossible in many instances unless one compromises the power output of the drive part or increases the lever portion of the engaging part accordingly. Apart from the obvious weight increase, the tool becomes higher and longer with the increase in leverage and the increase in piston movement to retain the same turning degrees per stroke. This in turn makes the tool less applicable in limited clearance applications.

SUMMARY OF THE INVENTION

Accordingly, it is an object of the present invention to provide a fluid-operated power tool which avoids the disadvantages of the prior art.

In keeping with these objects and with others which will become apparent hereinafter, one feature of the present invention resides, briefly stated, in a fluid-operated power tool which has an engaging part including an engaging element for engaging and turning a part of a threaded connector (a nut); and a drive part including a fluid-operated drive with a cylinder and a piston movable in the cylinder for turning the engaging element under the action of fluid admitted to the cylinder, the power drive part having a width which does not substantially exceed a width of the engaging part, which in turn does not substantially exceed the height of the nut. For this purpose, the width of the cylinder can be smaller than its height without reducing the square inch area of the piston and its force output.

When the fluid-operated power tool is designed in accordance with the present invention, it avoids the disadvantages of the prior art. The tool as a whole has a very small thickness and can be used in narrowclearance applications when a space for reaching a threaded connector is exceptionally narrow.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 2:
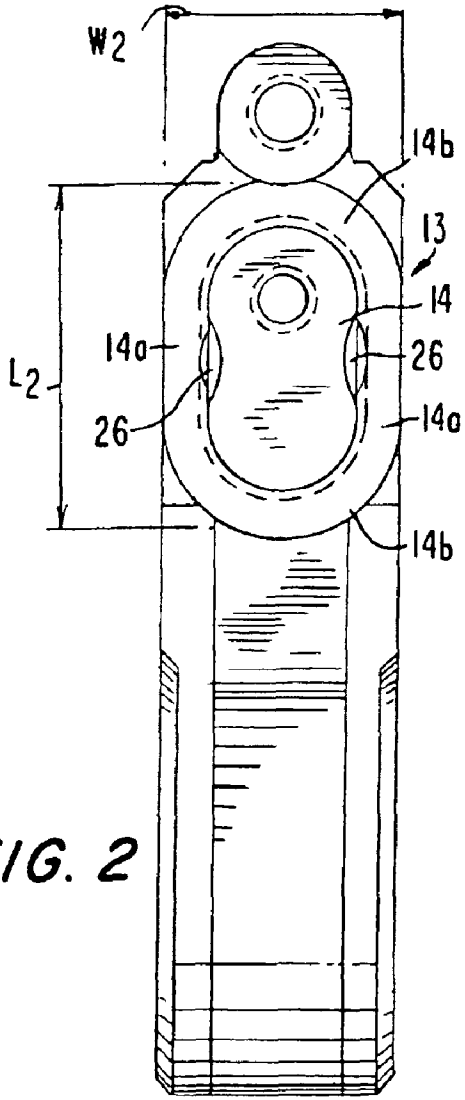
FIG. 2 is an end view of the fluid-operated power tool of FIG. 1.
Figure 1:
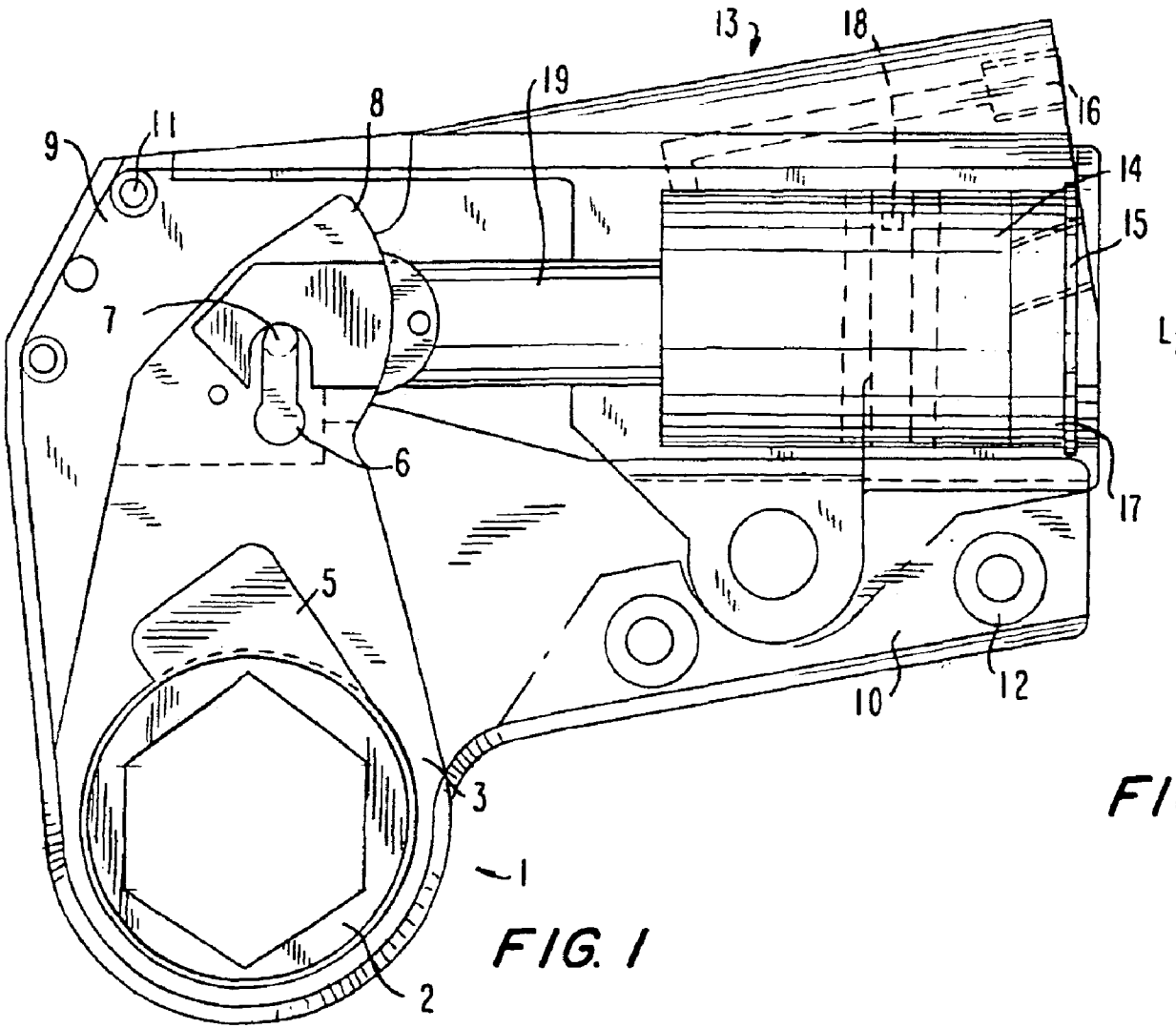
FIG. 1 is a side view of a fluid-operated power tool in accordance with the present invention.

A fluid-operated power tool in accordance with the present invention has an engaging part which is identified as a whole with reference numeral 1 and is used for engaging and turning a threaded connector, such as a nut, a bolt, etc. An engaging part has a ratchet 2 which has an outer cylindrical surface and is provided either with a hexagonal opening as shown in the drawings to be fitted on a nut, a bolt head, etc. or with a projecting shaft to engage for example into a recess of a counter sunk bolt head, etc. The ratchet is turnably supported in a drive plate 3 which is sandwiched between two side plates 4. A pawl is connected with the drive plate 3 and is turnable by the latter. It has a plurality of teeth engaging with outer teeth provided on a portion of the outer cylindrical surface of the ratchet 2, as well known in the art, to form a pawl-ratchet mechanism.

While the lower part of the drive plate 3 has the opening for receiving the ratchet 2 and carries the pawl 5, the opposite portion of the drive plate 3 has a slot 6 for receiving a spring biased pin 7, and a curved outer surface 8. Spacers 9 and 10 are arranged between the side plate 4, and the side plates 4 are connected with one another by connecting pins 11 and 12.

The fluid-operated power tool further has a power drive part which is identified as a whole with reference numeral 13. The drive part has a fluid-operated drive unit which includes a cylinder 14 which is provided with an advance port 15 and a retract port 16 and closed at the end by an end plug 17. The piston 18 is movably arranged in an inner chamber of the cylinder 14 and has a piston rod 19.

Figure 3:
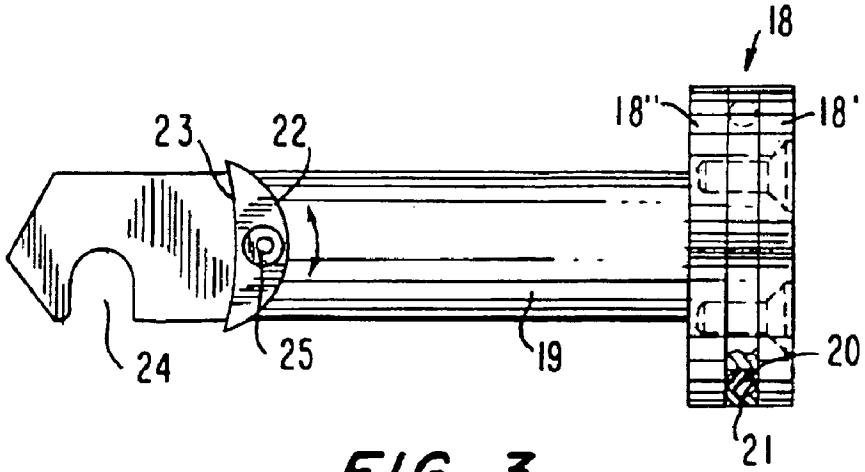
FIGS. 3 and 4 are two side views of a piston-piston rod assembly of the inventive fluid-operated power tool.
Figure 4:
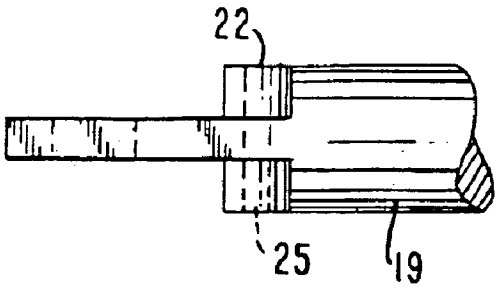

The piston 18 is composed of two parts 18' and 18" which are connected with one another for example by screws and from there between a groove. Sealing means for sealing the piston relative to the inner wall of the cylinder are arranged in the groove. The sealing means can include an O-ring 20 composed for example of a tetrafluorethylene and a seal ring 21 which radially outwardly surrounds the O-ring. The piston rod 19 carries a member 22 which is pivotable about its axis formed for example by a pin and has a curved surface 23. The left end of the piston rod 19 in FIGS. 3 and 4 is provided with a groove 24 which is fitted over the pin 7 while the curved surface 23 of the member 22 abuts against the curve surface 8 of the drive plate 3. Two such members 22 are arranged at both ends of the piston rod 19 as shown in FIG. 6, and can be supported by a single throughgoing pin 25.

As can be seen from FIG. 2, the engaging part 1 of the inventive fluid-operated power tool has a width $W_1$ while the power drive part of the fluid-operated power tool has a width $W_2$. The width of the power drive part does not exceed substantially the width of the engaging part, which in turn does not substantially exceed the width of a part of the threaded connector to be turned, such as a nut. Therefore, the tool as a whole can be introduced into very narrow spaces. In accordance with another feature of the present invention, the reduced width of the power drive part 13 of the inventive tool is obtained by forming the fluid-operator drive so that the width W2 of the power drive part 13 is substantially smaller than the length L2 of the same. For this purpose, the cylinder 14 is oval-shaped and has a wall with side wall portions 14a which are located closer to one another than the top and bottom wall portions 14b. However, the useful cross-sectional area of the cylinder remains substantially the same as if it were round.

The side wall portions 14a of the cylinder 14 are subjected to a high bending stress. In accordance with a further feature of the present invention, the side wall portions 14a have increased thickness which is provided by projections 26 extending inwardly toward the interior of the cylinder. The projections have inwardly convey surfaces as can be seen from FIG. 2. Therefore, the side wall portions 14a have a thickness which is greater than a thickness of the remaining portions of the wall of the cylinder 14.

Figure 5:
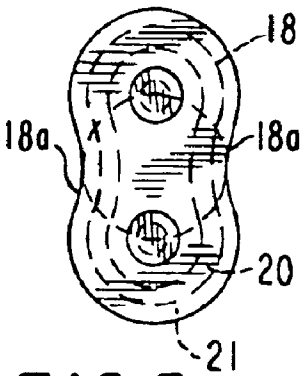
FIGS. 5 and 6 are views showing the assembly of FIGS. 3 and 4 from two opposite sides.
Figure 6:
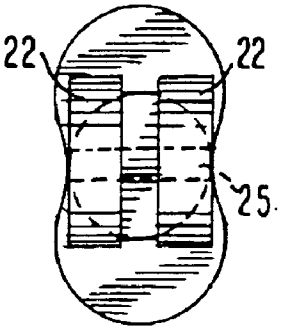

As can be seen from FIGS. 5 and 6, the piston 18 has a cross-sectional shape which has a with smaller than a length and is complementary to the shape of the inner surface of the cylinder 14. In particular, the piston 18 has an oval shape with side walls having concave portions 18a. The area of the oval piston however remains substantially the same as if it were round, so that its force output remains substantially the same. The sealing means, in particular the O-ring 20 and the seal ring 21, also have an oval shape corresponding to the oval shape of the inner surface of the cylinder 14.

During the operation, a fluid, for example a hydraulic fluid, is supplied to the advance port 15 and displaces the piston 18 in the cylinder 14 to the left, so that the piston rod 19 turns the drive plate 13 and the pawl 5 mounted on it, and the pawl 5 turns the ratchet 2 and therefore a threaded connector engaged by the ratchet, for example for tightening the threaded connector. For loosening the threaded connector, the fluid is supplied to the retract port 16 into another chamber of the cylinder 14 to displace the piston 18 in opposite direction, so that its piston rod 19 turns the drive plate in opposite direction to turn the pawl 5, which turns the ratchet 2 in the opposite direction to turn the threaded connector for example for loosening the threaded connector.

It will be understood that each of the elements described above, or two or more together, may also find a useful application in other types of constructions differing from the types described above.

While the invention has been illustrated and described as embodied in a fluid-operated power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A fluid-operated tool, comprising an engaging part including an engaging element for engaging and turning a threaded connector; and a drive part including a fluid-operated drive with a cylinder and a piston movable in said cylinder under the action of fluid admitted into said cylinder for turning said engaging element, said cylinder having a substantially non-round inner chamber and a substantially non-round cross-section with an outer width which substantially does not exceed width of said engaging part and an outer length which exceeds said width of said cylinder, said piston being substantially non-round in correspondence with a non-round shape of said inner chamber and having a cross-sectional shape with a length which is grater than a width, so as to allow working with the fluid-operated power tool in a limited clearance area because of a smaller outer width of said cylinder than its length and at the same time to provide transmission of a high torque because of the greater length of said piston than its width.

2. A fluid-operated tool as defined in claim 1, wherein said cylinder has a peripheral wall with two side portions which are spaced from one another in direction of the width of said cylinder and which have a thickness which exceeds a thickness of a remaining portion of said peripheral wall, said side portions of said peripheral wall having convex projections extending into an interior of said cylinder, said piston having side walls which are spaced from one another in direction of the width and have concave recesses corresponding to said convex projections of said cylinder, so that said convex projections of said side portions of said peripheral wall of said cylinder extend into said concave recesses of said side walls of said piston.

3. A fluid-operated tool as defined in claim 2, wherein said piston has a groove and is provided with an O-ring, said O-ring having two opposite sides which are spaced from one another in direction of the width and have concave cavities corresponding to said convex projections of said side portions of said peripheral wall of said cylinder.

4. A fluid-operated tool as defined in claim 2, wherein said engaging element has an engaging portion arranged to engage a threaded connector, and another portion which is spaced from said engaging portion, said piston having a piston rod operatively connected with said other portion, so that during a displacement of said piston, said piston acts on said other portion and turns said engaging element, said other portion being provided with an arcuate surface while said piston rod is provided with a member pivotably mounted on said piston and having an arcuate surface cooperating with said arcuate surface of said other portion of said engaging element.

5. A fluid-operated tool as defined in claim 1, wherein said cross-section of said cylinder, said inner chamber of said cylinder and said cross-section of said piston are substantially oval.

* * * * *